United States Patent [19]
Koehler

[11] Patent Number: 5,129,283
[45] Date of Patent: Jul. 14, 1992

[54] PUSH TO TURN MECHANISM
[75] Inventor: Randal W. Koehler, Tigaro, Oreg.
[73] Assignee: Eaton Corporation, Cleveland, Ohio
[21] Appl. No.: 575,758
[22] Filed: Aug. 31, 1990
[51] Int. Cl.⁵ .................... G05G 1/10; G05G 1/04; G05G 5/06
[52] U.S. Cl. ...................... 74/553; 74/526; 74/527; 403/335
[58] Field of Search ................ 74/527, 553, 526, 504; 403/335

[56] References Cited
U.S. PATENT DOCUMENTS

| | | | |
|---|---|---|---|
| 3,528,315 | 9/1970 | Marquis | 74/553 |
| 3,662,618 | 5/1972 | Kroll et al. | 74/527 |
| 3,999,442 | 12/1976 | Decker et al. | 403/335 X |
| 4,132,129 | 1/1979 | Pratt | 74/553 |
| 4,136,569 | 1/1979 | Hollwelk | 74/553 X |
| 4,237,746 | 12/1980 | Rossi et al. | 74/504 |
| 4,486,918 | 12/1984 | Peebles | 74/553 X |
| 5,020,389 | 6/1991 | Sigler | 403/335 X |

FOREIGN PATENT DOCUMENTS 3236531 4/1984 Fed. Rep. of Germany ........ 74/553

Primary Examiner—Vinh T. Luong
Attorney, Agent, or Firm—R. A. Johnston

[57] ABSTRACT

A rotary actuator for an appliance having a shaft with a radially outwardly-extending boss with a cam surface thereon locked in an "OFF" position between a stop and a detent lug. The user is required to move (push) the shaft axially in order to enable the boss to clear the detent to permit rotary movement away from the "OFF" position stop for affecting a control function. As the boss is rotated past the detent to the desired "ON" position, and upon user release, the shaft is spring biased to return to its initial axial position. Upon return rotary movement of the shaft by the user, the cam automatically moves the shaft axially to enable the boss to pass by the detent to return to the "OFF" position against the stop.

2 Claims, 1 Drawing Sheet

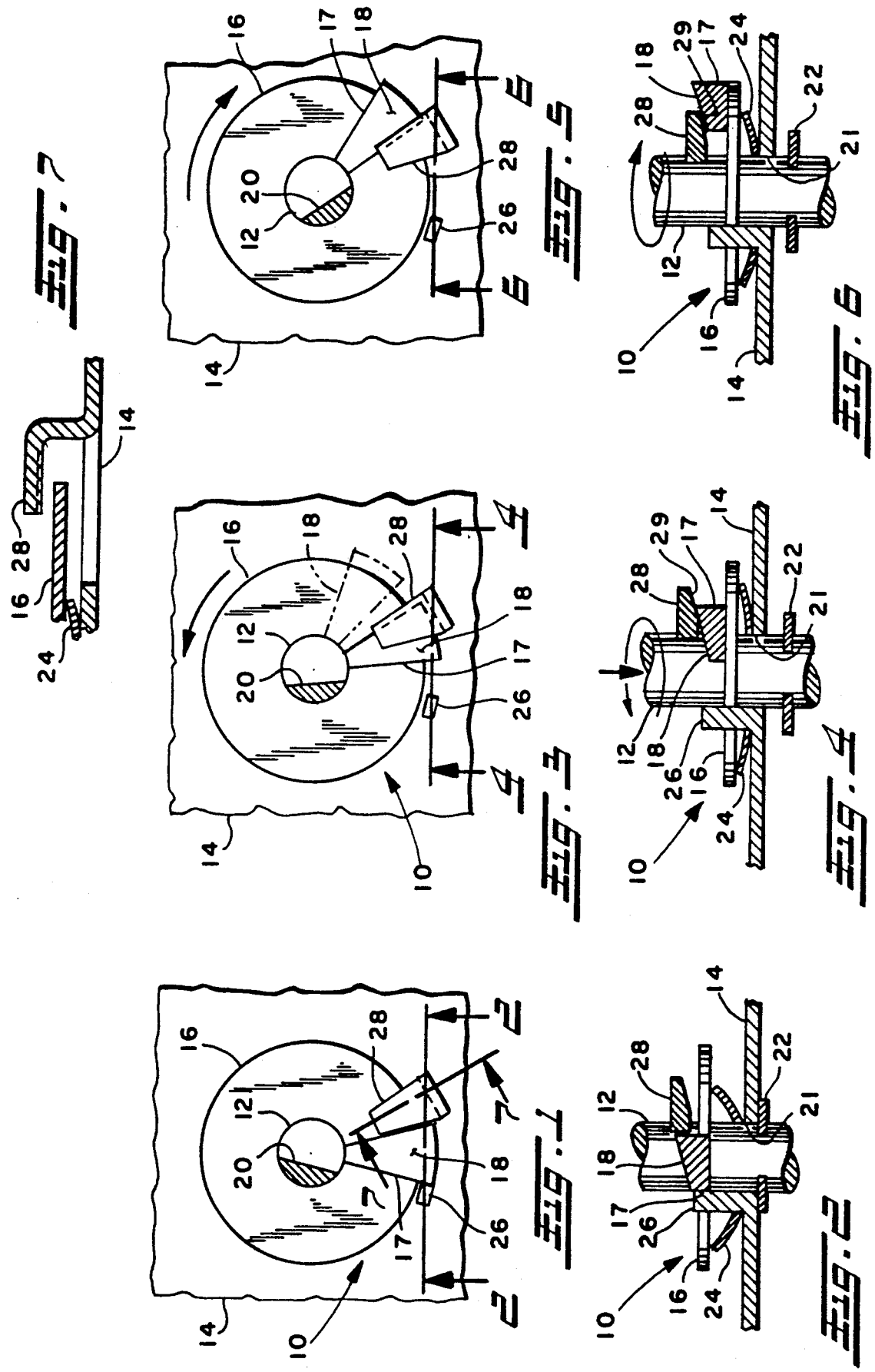

PUSH TO TURN MECHANISM

BACKGROUND OF THE INVENTION

The present invention relates to mechanisms of the type employing a rotatable shaft for performing an adjustment or change of operating characteristics for control of an appliance and particularly to mechanisms of the type wherein the appliance user positions a rotary knob attached to the shaft. Control adjustment mechanisms of this type are typically employed for appliances such as thermostats for controlling refrigerators, wall mounted thermostats for room heating and cooling control, and controls employed on household cooking and laundry appliances.

In cooking appliances and particularly appliances utilizing fuel gas burners, it has been found desirable to employ a push-to-turn shaft mounted rotary knob for controlling the burner ignition system. This type of push-to-turn knob control is particularly suitable for fuel burner ignition systems where it is desired to energize an automatic igniter commensurate with the opening of a fuel gas valve. In such gas burner controls, it is well known to provide a rotary cam attached to the knob shaft for setting the position of a switching mechanism which controls on electrically operated igniter. Push-to-turn controls of the latter type usually have a first rotary position for energizing the electrical igniter and a second rotary position for providing opening of the gas valve, e.g. an "ON" position.

Where fuel gas burners are employed in household appliances, it has been desired to provide a safety device on the burner control to prevent inadvertent user rotation of the control knob to an undesired position or tampering with the knob position by small children in a manner which would create a hazardous condition.

Heretofore, push-to-turn rotary shaft adjustment controls have employed a detent to fix the shaft in a desired safety or "OFF" Position when the shaft knob is rotated unless the shaft is pushed or the knob depressed, to cause the shaft detent to release, permitting rotation of the knob and the shaft. However, it has been found that with rapid rotation of the knob by the user, the knob may be inadvertently rotated past the detent position; and, this is particularly a problem where the detent employs a relatively weak spring. Thus it has long been desired to provide a way or means of providing a rotary adjustment mechanism for controlling an appliance which has a securely locked "OFF" position which prevents inadvertent rotation of the knob through the "OFF" position.

SUMMARY OF THE INVENTION

The present invention provides a push-to-turn shaft operator for user positioning or setting of a control employed for an appliance or mechanism where it is desired to select a state or condition of operation by rotary positioning of a dial or knob. The operator of the present invention is particularly suitable for control settings for household appliances employing a gas burner, such as water heaters, ranges, and ovens, where it is desired to have a safety, or locked "OFF" position of the knob, and to prevent inadvertent movement therefrom.

The present invention employs a shaft having a knob thereon which is pushed by the user to move from an initial to a second axial position whereupon a cam extending axially from the shaft may be rotatably moved from a position registered against a limit stop to a position beyond a detent to position the cam to the desired control or "ON" position. Release of the knob by the user upon the cam reaching the desired position, enables the shaft to return to its initial axial position. Reverse rotation of the shaft from the desired "ON" position causes the cam to contact a stationary detent which automatically moves the shaft to the second axial position to permit passage of the cam beyond the detent to return to the initial "OFF" position against limit stop. Upon the cam passing the detent the shaft is biased to the initial axial position which locks the cam between the initial limit stop and the detent. Subsequent rotation of the cam in either direction cannot be accomplished without deliberate user axial movement of the knob and shaft from the initial to the second position.

The present invention thus provides a positive locking of a control knob and shaft in the initial or "OFF" position between a limit stop and a detent, and prevents inadvertent rotary positioning of the shaft without deliberate axial movement of the shaft to cause the cam to clear the detent.

BRIEF DESCRIPTION OF THE DRAWINGS

FIG. 1 is an end view of the operator of the present invention showing the cam boss in the "OFF" or locked position;

FIG. 2 is a section view taken along section indicating line 2—2 of FIG. 1;

FIG. 3 is a view similar to FIG. 1 showing the cam boss rotated from the position of FIG. 1 to the position passing the detent to the "ON" position in dashed outline;

FIG. 4 is a section view taken along section indicating line 4—4 of FIG. 3;

FIG. 5 is a view similar to FIG. 1 showing the shaft and cam boss being rotated away from the position of FIG. 3 and contacting the cam for effecting axial movement of the shaft to the second position;

FIG. 6 is a section view taken along section indicating line 6—6 of FIG. 5; and, FIG. 7 is a portion of a section view taken along section indicating line 7—7 of FIG. 1.

DETAILED DESCRIPTION

Referring to FIG. 1, the operator of the present invention is indicated generally at 10 as having a shaft 12 journalled for rotation on a mounting structure plate or base 14. The shaft has provided thereon a radially extending circular flange 16, which has boss or a portion 17 thereof raised axially, and which extends for an arcuate segment of approximately 10 to 25 degrees of central included angle and beyond the outer periphery. The upper surface of boss 17 forms an axially inclined cam surface 18. Shaft 12 has a flattened portion 20 provided thereon adapted for receiving a selector knob (not shown) in engagement thereon.

Referring to FIGS. 1 and 2, shaft 12 is shown as journalled through base aperture 21 and has a snap ring 22 provided thereon and positioned on the underside of the mounting structure plate 14. Ring 22 is registered against plate 14 when the shaft is in the initial or first axial position illustrated in FIGS. 1 and 2. The shaft is biased to the first axial position by a spring washer 24 provided about the shaft and disposed between the upper surface of the mounting plate 14 and the undersurface of the circular flange 16.

A limit stop in the form of lug 26 is provided on the base 14; and in the initial position of the cam 18 shown in FIGS. 1 and 2, the edge of boss 17 is registered against the limit stop 26.

Referring to FIGS. 1, 2, and 7, a detent member 28 is formed, preferably integrally, on the base 14 in the form of a right angled tab which extends above and radially inwardly over the outer circumference of the flange 16 as shown in FIG. 7.

Referring particularly to FIGS. 1 and 2, the boss 17 with cam 18 is disposed between the detent 28 and the limit stop 26 when the shaft is in the upward or first axial position shown in FIG. 2. The boss 17 is thus locked or secured between the limit stop 26 and detent 28 in such a manner that rotation of the shaft 12 is prevented. The position of the shaft and boss 17 shown in FIGS. 1 and 2 is, in a typical gas burner appliance control application, referred to as the safety or the "OFF" position.

Referring to FIGS. 3 and 4, the shaft 12 has been moved from the initial position in FIG. 2 to downwardly or in the direction of the black arrow in FIG. 4 to the position illustrated wherein the snap ring 22 is spaced from the undersurface of the base structure 14. The shaft 12 has been rotated in the direction of the arrow shown in FIG. 3 or counter clockwise to a position wherein the boss 17 with cam surface 18 is passing beneath the upper portion of detent 28 as shown in solid outline in FIGS. 3 and 4. With the shaft 12 moved to the second axial position shown in FIG. 4, the user may continue to rotate the shaft in the counterclockwise direction until the boss 17 with cam 18 reaches the position shown in dashed outline in FIG. 3. In a typical appliance control application of the operator 10, the position of the boss 17 illustrated in dashed outline in FIG. 3 would correspond to the selected rotary position of shaft 12 for the control function or "ON" position.

Referring to FIGS. 5 and 6, the shaft 12 has been rotated from the position shown with boss 17 in dashed outline in FIG. 3 in a clockwise direction to the position shown in solid outline shown in FIG. 5 and 6. In the position of the boss 17 shown in FIG. 5 and 6, the inclined cam surface cam 18 has contacted the undersurface of detent 28 engaging the inclined surface 29 provided thereon so as to cause the shaft 12 to move downwardly to the axial position shown in FIG. 6 wherein the snap ring 22 is spaced from the undersurface of the plate 14. The downward movement of shaft 12 caused by the cam 18 to the position shown in FIG. 6 enables the boss 17 to be user rotated clockwise further to return to the position shown in FIG. 1. Upon user release of the shaft 12, the shaft is biased upwardly to the initial axial position shown in FIG. 2; and, the sides of the boss 17 are secured from rotation between the sides of the detent 28 and the limit stop 26.

The present invention thus provides a push-to-turn rotary shaft operator for setting the control function condition of an appliance wherein inadvertent rotation of the shaft is prevented by positive engagement of a cam boss between a limit stop and a detent in such a manner that deliberate axial movement of the shaft is required to permit rotation of the "OFF" or safety position.

Although the present invention has been herein above been described with respect to the illustrated embodiments, it will be understood that the invention is capable of modification and variation, which will be encompassed by the scope of the following claims.

I claim:

1. A rotary shaft control actuator for an appliance comprising:
   (a) base means having a shaft with a boss thereon extending radially outwardly therefrom encompassing a central included angle not greater than 25°, said shaft and boss user-rotatable between a first rotary control position and a second rotary control position, said base means including means defining a limit disposed for contact by said boss in said first control position, said shaft independently user movable between a first and second axial position;
   (b) detent means disposed on said base means between said first and second control positions and operatively contacted by said boss to prevent movement from said first to said second control position when said shaft is in said first axial position;
   (c) means defining an axially-inclined cam surface on at least on of said boss and said detent means;
   (d) means biasing said shaft and boss to said first axial position, wherein upon user movement of said shaft to said second axial position said boss is rotatable past said detent means to said second control position and in which position, upon user release, said shaft returns to said first axial position, and upon user movement in the reverse direction toward said first position, said cam surface is operative to move said shaft and boss to said second axial position permitting said boss to move past said detent means and return to said first control position where said shaft and boss return to said first axial position.

2. A rotary shaft control actuator for an appliance comprising:
   (a) base means having a shaft with a boss thereon extending radially outwardly therefrom, said shaft and boss user-rotatable between a first rotary control position and a second rotary control position, said base means including means defining a limit stop disposed for contact by said boss in said first control position, said shaft independently user movable between a first and second axial position;
   (b) detent means comprising a generally hook-shaped lug disposed on said base means between said first and second control positions and operatively contacted by said boss to prevent movement from said first to said second control position when said shaft is in said first axial position;
   (c) means defining an axially-inclined cam surface on at least on of said boss and said detent means;
   (d) means biasing said shaft and boss to said first axial position, wherein upon user movement of said shaft to said second axial position said boss is rotatable past said detent means to said second control position and in which position, upon user release, said shaft returns to said first axial position, and upon user movement in the reverse direction toward said first position, said cam surface is operative to move said shaft and boss to said second axial position permitting said boss to move past said detent means and return to said first control position where said shaft and boss return to said first axial position.

* * * * *